United States Patent Office 2,919,684
Patented Jan. 5, 1960

2,919,684

FUEL CONTAINING ANTI-ICING ADDITIVE

Donald E. Carr, Bartlesville, Okla., assignor to Phillips Petroleum Company, a corporation of Delaware No Drawing. Application January 21, 1954
Serial No. 405,519

7 Claims. (Cl. 123—1)

This invention relates to a novel fuel composition. In one aspect, it relates to a method of operating an internal combustion engine. In another aspect, it relates to a method of preventing cold stalling of such an engine.

It has been observed that an internal combustion engine having a carburetor will stall while being warmed up when certain combinations of atmospheric temperature and humidity exist. This stalling, known as "cold stalling," is caused by the formation of ice on the throttle plate and adjacent parts of the carburetor, and especially around the idling jet and the throttle plate. The ice results from the cooling effect of the vaporization of fuel within the carburetor and from the pseudo-adiabatic expansion of carburetor air in the metering venturi and past the edges of the throttle plate, the cooling causing moisture in the incoming air to accumulate as ice in the carburetor. The accumulated ice prevents free flow of fuel and air to the cylinders. Cold stalling ordinarily occurs when the atmospheric temperature is in the range of about 30 to 60° F. and the relative humidity is greater than about 60 percent.

One prior art method of preventing cold stalling caused by ice formation in the carburetor involves the incorporation of isopropyl alcohol as an anti-icing agent into the fuel supplied to the engine. In road tests using four 1953 model automobiles operated in an ambient air temperature of 40° F. and supplied with air of 100 percent relative humidity, an average of 16 stalls for each car was encountered using a regular grade fuel not containing an anti-cold-stalling additive. The addition of 2 weight percent isopropyl alcohol to the fuel resulted in freedom from cold stalling in all of the automobiles under the conditions of the test, but the addition of only 1 weight percent isopropyl alcohol resulted in an average of 3 stalls in each of the four automobiles. More recent tests show that 2 weight percent of isopropyl alcohol, though effective, does not give complete freedom from stalling in all cars. The procedure used in the road test comprised starting and idling the engine, which was originally at the temperature of the ambient air, for a period of 20 seconds; driving the automobile at 20 miles per hour for 0.2 mile; stopping the automobile and idling the engine for 20 seconds; and repeating the driving, stopping, and idling procedure until three consecutive stall-free stops were obtained. Whenever the engine stalled, it was immediately restarted and driven for 0.2 mile at 20 miles per hour before another stop was made.

The present invention provides a method and a novel fuel composition, whereby the operational difficulties of cold-stalling and rough idling encountered in connection with carburetted internal combustion engines, such as automotive, aircraft, marine engines, and the like, operated under cool, humid atmospheric conditions, are reduced. The invention provides a fuel composition which permits a carburetted internal combustion engine to be operated at idling or light load conditions in atmospheric conditions of temperature in the range of 30 to 60° F. and relative humidity above about 60 percent without excessive stalling resulting from the formation of ice in the carburetor of the engine.

This invention provides a novel, anti-stalling fuel composition comprising at least one hydrocarbon boiling within the gasoline boiling range and a minor proportion, sufficient to prevent cold-stalling, of a pyridine represented by the formula

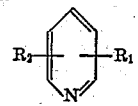

wherein $R_1$ is selected from the group consisting of alkyl and alkenyl radicals having from 1 to 6 carbon atoms and $R_2$ is selected from the group consisting of hydrogen, alkyl radicals having from 1 to 6 carbon atoms, and alkenyl radicals having from 1 to 6 carbon atoms.

Further, according to this invention, cold stalling of an internal combustion engine is prevented by supplying to the carburetor of such an engine, together with a hydrocarbon fuel of the type described, a pyridine of the type set forth hereinabove. The pyridine can be introduced as a constituent of the fuel, e.g. in solution or suspension therein, or from a separate source, as an auxiliary fuel, so that the use of the auxiliary fuel can be discontinued when cold-stalling conditions do not exist.

The pyridines useful as anti-icing additives according to this invention include monoalkyl pyridines such as the ethyl and the propyl pyridines, polyalkyl pyridines such as the methyl ethyl pyridines, and alkyl alkenyl pyridines such as the methyl butenyl pyridines and the ethyl propenyl pyridines.

A preferred class of pyridine additives according to this invention are those pyridines within the foregoing description which boil above 70° C. at 10 mm. Hg. This class includes methyl ethyl pyridines, particularly 3-ethyl-4-methyl pyridine (beta-collidine); the 2-methyl-5-butenylpyridines, of which several isomers exist (e.g. the cis and the trans Δ-1 butenyl isomers and the cis and the trans Δ-2 butenyl isomers); and 2-propenyl-5-ethyl-pyridine, and others.

A highly satisfactory additive according to this invention is a high-boiling mixture obtained as a by-product of the synthesis of pyridines by the reaction of paraldehyde with ammonia at a temperature in the range 400 to 600° F. The reaction can be conducted noncatalytically or in the presence of a catalyst such as ammonium hydrogen fluoride, ammonium acetate or ammonium chloride. The reaction pressure is sufficient to maintain the reactants substantially in the liquid phase. A molar excess of ammonia is ordinarily used. The additive used according to this invention is the residue remaining after the material boiling below 70° C. at 10 mm. Hg has been removed from the product of the reaction. This material ordinarily contains from 4 to 6 weight percent of 3-ethyl-4-methyl pyridine, from 1 to 2 weight percent of other methyl ethyl pyridines, from 13 to 15 weight percent of 2-methyl-5-butenylpyridines, and from 2 to 4 weight percent of 2-propenyl-5-ethylpyridine, together with other nitrogen bases of undetermined identity, some of which appear to contain more than one basic nitrogen atom per molecule. Infrared spectral analyses indicate the presence of the trans isomers of the 2-methyl-5-butenyl pyridines.

Compounds of the class of additives described above are very effective for reducing carburetor icing and engine stalling when admixed separately in the hydrocarbon fuel in small amounts. However, the compounds described above can also be employed in combination with other compounds which have an anti-icing effect to obtain an improved anti-icing additive. Specific compounds which can be admixed with the additives of this invention are the monoalkyl ethers of the monoethylene, diethylene, and triethylene glycols and include ethylene glycol monoethyl ether (Cellosolve) and diethylene glycol monoethyl ether (Carbitol). Compounds which have no anti-icing effect by themselves can also be admixed with the single or combination anti-icing additives to increase the amount of these compounds which can be dissolved in the fuel. Methyl and ethyl alcohol can be used for this purpose. The amount of ether or alcohol used is within the range stated for the pyridine additives.

The proportion of the pyridine additives used in the fuels according to this invention is ordinarily in the range 0.001 to 0.9 weight percent. In some cases, however, larger amounts, e.g. up to 1.0 or 3.0, or, in some instances, as high as 10 weight percent, particularly in the case of the high-boiling pyridines, especially the alkyl alkenyl pyridines can be used. The additives can be in solution or in suspension in the fuel, but are preferably in solution.

The anti-icing additives of this invention can be admixed with any carburetted internal combustion engine fuel and are of particular application to an engine fuel having a volatility such that the 50 percent distillation point falls below about 310° F. These fuels may be obtained from mineral oils or gaseous hydrocarbons derived from any source and by any of the known commercial methods of manufacture, such as straight-run distillation, catalytic cracking, thermal cracking, destructive hydrogenation, polymerization, alkylation, hydrogenation, or the like. The fuels may also contain commonly used fuel additives such as lead alkyl anti-detonants (e.g. tetraethyl lead), lead scavenging agents, dyes, gum inhibitors, oxidation inhibitors, and the like. The gasoline used should be free of elemental sulfur. It should be "doctor-sweet." Generally the fuel can be any desired hydrocarbon, or mixture of hydrocarbons, having a boiling point within the gasoline boiling range, i.e. 70 to 420° F., or it can be a liquefied petroleum gas, e.g. butane.

EXAMPLE

Cold stalling tests were performed using a Carter carburetor, type WO-870S, mounted on a motored CFR Supercharged Aviation Fuel Test engine which served to draw the fuel through the carburetor and to dispose of the combustible fuel-air mixture. The carburetor was mounted in an insulated chamber and the air supplied to the carburetor had a temperature of 40° F. and 100 percent relative humidity. The air was supplied at a rate of 0.58 pound per minute and the air-fuel ratio of the combustible mixture varied between 8:1 to 10:1. The CFR engine was operated at constant speed of 2000 r.p.m. with 6 inches Hg vacuum manifold pressure. The base fuel used in the tests was an unleaded automotive gasoline having a Reid vapor pressure of 14.0 lb. and the following ASTM distillation (° F.):

| | |
|---|---|
| Initial | 79 |
| 10 percent | 96 |
| 20 percent | 109 |
| 40 percent | 138 |
| 60 percent | 186 |
| 80 percent | 264 |
| Final | 392 |

In the anti-icing tests, the fuels were cooled to a temperature of 40° F. and maintained at that temperature while being supplied to the carburetor.

In the test procedure, the CFR engine was operated on the injected fuel at a constant speed of 2000 r.p.m. and then the injected fuel flow rate was reduced as the test fuel was admitted to the engine through the carburetor to maintain the constant 2000 r.p.m. engine speed. The length of time was measured from the start of the flow of test fuel to the carburetor to the point where the ice buildup on the throttle plate and adjacent parts of the carburetor was sufficient to raise the manifold vacuum 2 inches of mercury. For purposes of evaluating the anti-icing qualities of the additives of this invention, these icing tests were also performed on a test fuel containing isopropyl alcohol.

The anti-icing characteristics of a mixture of pyridine material obtained from the methylethylpyridine batch fractionator kettle of a methylethylpyridine synthesis process of the type described are given in Table I and compared to the anti-icing effects of other additives. In obtaining these data, the base fuel was tested with several concentrations of additive and the concentration of additive equivalent in anti-icing quality to 2.0 weight percent isopropyl alcohol was determined. The methylethylpyridine kettle product boiled above 70° C. at 10 mm. Hg.

Table I

| Additive | Concentration in Weight Percent Equivalent to 2.0 Weight Percent Isopropyl Alcohol |
|---|---|
| 20 vol. Percent Methylethylpyridine Kettle Product. 80 vol. Percent Ethylene Glycol Monoethyl Ether. | 0.32 |
| Ethylene Glycol Monoethyl Ether | 0.50 |

The data show that an additive mixture of pyridines and ethylene glycol monoethyl ether was more effective in combating cold stalling than was the ether alone.

While certain compositions, structures, process steps and examples have been described for purposes of illustration, the invention clearly is not limited thereto. The essence of the invention is a composition comprising at least one gasoline hydrocarbon and a small amount, effective to prevent cold-stalling, of an alkyl and/or alkenyl-substituted pyridine; and a method which comprises supplying such a pyridine to the carburetor of an internal combustion engine to prevent cold-stalling thereof.

I claim:

1. A fuel composition comprising as a major component a mixture of hydrocarbons which boil in the gasoline range and from 0.001 to 0.9 weight percent of a distillation residue obtained by reacting paraldehyde with ammonia at a temperature in the range 400 to 600° F., said residue boiling above 70° C. at 10 mm. Hg. and comprising substituted pyridines.

2. A fuel composition comprising as a major component a mixture of hydrocarbons boiling within the gasoline range and from 0.001 to 0.9 weight percent of a mixture comprising a monoalkyl ether of an ethylene glycol and a distillation residue which boils above 70° C. at 10 mm. Hg. and is obtained as a product of the reaction of paraldehyde with ammonia at a temperature in the range 400 to 600° F. to produce alkyl pyridines.

3. A composition according to claim 2 wherein said ether is ethylene glycol monoethyl ether.

4. A method of operating an internal combustion engine under atmospheric conditions of temperature and humidity at which cold stalling normally occurs, which method comprises supplying to the carburetor of said engine, simultaneously with a gasoline, from 0.001 to 0.9 weight percent, based on said gasoline, of a mixture of pyridines which boil above 70° C. at 10 mm. Hg, said pyridines being represented by the formula

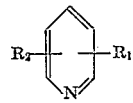

wherein $R_1$ is selected from the group consisting of alkyl and alkenyl radicals having from 1 to 6 carbon atoms and $R_2$ is selected from the group consisting of hydrogen, alkyl radicals having from 1 to 6 carbon atoms, and alkenyl radicals having from 1 to 6 carbon atoms.

5. In the operation of an internal combustion engine under cold idling conditions at an atmospheric temperature in the range 30 to 60° F. and a relative humidity greater than 60 percent, the method which comprises supplying to the carburetor of said engine, as a constituent of the fuel, from 0.005 to 0.9 weight percent, based on said fuel, of a distillation residue which boils above 70° C. at 10 mm. Hg and which is obtained from the reaction of paraldehyde with ammonia at a temperature in the range 400 to 600° F. to form alkyl pyridines.

6. In the operation according to claim 5, the method which comprises supplying to said carburetor from 0.005 to 0.9 weight percent of a mixture of said residue and ethylene glycol monoethyl ether.

7. As an additive for a gasoline, a mixture comprising 80 volume percent ethylene glycol monoethyl ether and 20 volume percent of a distillation residue which boils above 70° C. at 10 mm. Hg and is obtained by the distillation of a product of the reaction of paraldehyde with ammonia at a temperature in the range 400 to 600° F. to produce alkyl pyridines.

References Cited in the file of this patent

UNITED STATES PATENTS

| | | |
|---|---|---|
| 2,560,602 | Schulze et al. | July 17, 1951 |
| 2,560,898 | Schulze et al. | July 17, 1951 |
| 2,579,692 | Neudeck | Dec. 25, 1951 |
| 2,599,338 | Lifson et al. | June 3, 1952 |
| 2,706,677 | Duncan et al. | Apr. 19, 1955 |
| 2,784,067 | Duncan et al. | Mar. 5, 1957 |